June 20, 1944. C. ADLER, JR Re. 22,497
SIGNAL LAMP
Original Filed Nov. 9, 1943
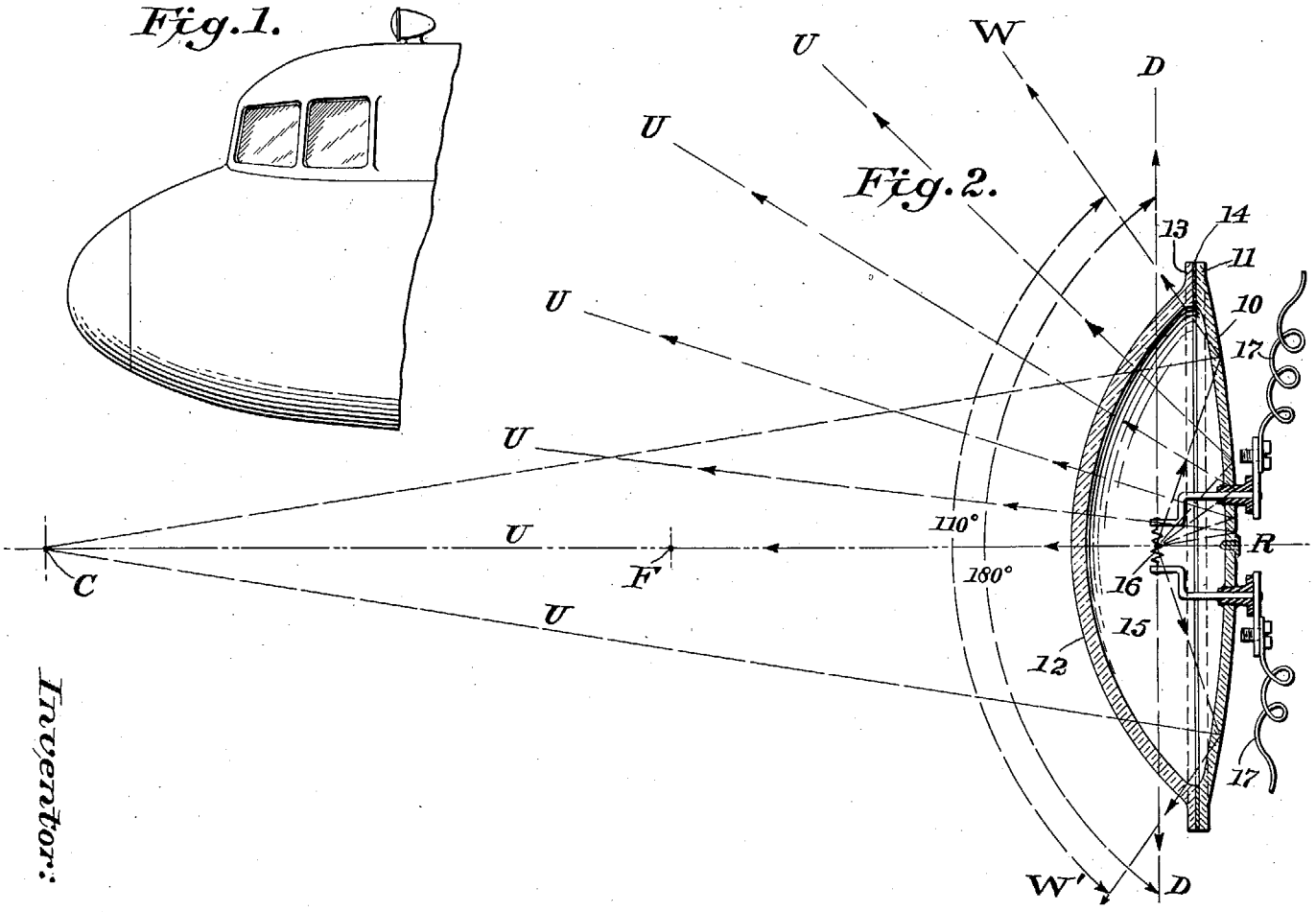
Inventor:
Charles Adler, Jr.,
By Cushman Darby & Cushman Attorneys.

Reissued June 20, 1944

Re. 22,497

UNITED STATES PATENT OFFICE 22,497

SIGNAL LAMP

Charles Adler, Jr., Baltimore, Md.

Original No. 2,339,243, dated January 18, 1944, Serial No. 509,628, November 9, 1943. Application for reissue April 7, 1944, Serial No. 530,190

4 Claims. (Cl. 176—34)

The present invention relates to signal lamps particularly for aircraft to improve the safety of night flying at high speed.

The primary object of the invention is to provide a signal lamp of larger luminous area than the usual position light signals and also having a longer range of visibility as well as a wider spread whereby a signal is presented forwardly, to the sides and above and below an aircraft carrying the lamp in flight.

An equally important object of the invention is to provide a forward signal lamp having a reflector possessing critical characteristics in association with a light source disposed off the focal point of the reflector to the end that regardless of the position from which the lamp is viewed the light transmitting area of the lamp is visibly and arrestively illuminated. That is to say, beams are reflected from substantially every point of the reflector and visibly projected throughout substantially the entire light transmitting area of the lamp as non-parallel beams. These beams have a desirable wide angle spread, e. g. of at least 110° and assure that the pilot of a directly approaching aircraft as well as the pilot of an indirectly approaching aircraft will be presented with the signal.

An additional object of the invention is to provide a lamp wherein the light source is directly visible throughout substantially the entire cover glass or light transmitting area. That is to say, the light source extends beyond the confines of the reflector, and hence direct beams are visible as well as the reflected beams and the light source produces a spherical angle of illumination substantially of the order of a hemisphere.

Another object of the invention is to provide a lamp which does not add substantial weight or drag and can be installed without requiring that the current supply facilities of the aircraft be augmented.

A further object of the invention is to provide a lamp embodying the "sealed beam" structure, namely a sealed chamber defined by the reflector and cover glass which may be evacuated and filled with a suitable gas in accordance with the well known "sealed beam" principle, the light source such as a filament being disposed in the chamber, and preferably fixed in relation to the reflector to produce the improved results. I have found that in such a construction beams of light are reflected from substantially every point of the reflector provided the critical reflector structure and disposition of the filament with respect thereto are adhered to in accordance with this invention. The presence of a light bulb obscures some of the reflected rays, particularly centrally of the reflector and therefore the lamp does not present a signal when viewed at some angles, and furthermore, by employing the sealed beam structure, blackening does not take place, so that the lamp retains its efficiency throughout its life.

In achieving the foregoing objects, I have found that certain critical features must be embodied in a successful lamp. By actual experiments, it has been established that the concavity of the reflector bears a direct critical relation in association with a light source located out of the focal point to the end that non-parallel beams having a wide angle spread are produced with complete freedom from dead spots on the reflecting surface. In other words, the present lamp overcomes the objection of having beams reflected only from the sides and top and bottom of the reflector outwardly and no beams being reflected forward from the central portion of the reflector. The light source is critically located with respect to the reflector in a manner to produce reflected beams having a wide angle spread which are reflected from the entire reflecting surface of the reflector, whereby an arrestive signal will be presented to pilots of directly and indirectly approaching aircraft.

The present lamp has been developed after careful study of the problems associated with alleviating the hazards of aircraft flying at night at high speeds, for instance 300 miles per hour or more and is to be distinguished from aircraft landing lights or recognition lights (the latter consuming too much current to be operated continuously), automobile headlights, railroad signals, traffic signals, and maritime or ships' running lights. That is to say, the problem described above requires that a light of suitable intensity be produced which, for three dimensional flying at high speeds of 300 miles per hour or higher at night, must (1) project intense beams of light forwardly, above and below the aircraft as well as to the sides of the same, and (2) have a visible range greater than that of the usual position lights or illuminating lights.

The reflector possesses the critical characteristics of being appreciably shallower than reflectors heretofore employed in "sealed beam" lamps. I find that lamps having a diameter of 3 inches or more, for instance up to 8 inches in diameter, require a reflector having a concavity such that a chordal line passing across the axis of the reflector comprehends the segment of a circle having an arc length of more than about 5 degrees and not more than about 45 degrees. In other words, the reflector of the present invention has substantially the contour or curvature of the usual watch glass. The focal point of such a reflector is outside of the cover glass and the light source is located within the sealed chamber closer to the reflector than to the focal point. The light source or filament is definitely positioned out of the focal point of the reflector and related thereto in such a manner as to produce with the reflector non-parallel beams of any desirable maximum angle of spread. That is to say, beams of light are reflected from all points of the reflector surface uniformly with some of the beams having a wide spread, e. g. at least 110°, and the beams being of substantially equal intensity. Such beams are projected through all points in the cover glass comprehend within the area defined by the beams having the widest spread, whereby said projected beams are visibly presented forwardly, to the sides and above and below the lamp, and the aircraft on which the lamp is carried.

When a sealed beam lamp having a reflector of the foregoing characteristics and a light source positioned with respect thereto so as to produce non-parallel beams of suitably controlled spread, some of which have a light spread of at least 110 degrees, beams are reflected from every point of the reflecting surface, as I established conclusively by projecting a beam pattern from the lamp upon a screen. The beam pattern was uniform throughout its area on the screen, whereas when a lamp bulb was employed, or a reflector not possessing the critical structure, the beam patterns on the screen showed central dark areas or dead spots. It is this latter condition which the present invention effectively overcomes.

In the accompanying drawing I have illustrated one form of the invention and it is to be appreciated that changes in dimension of the lamp may be resorted to without departing from the principles and discoveries herein set forth.

In the drawing:

Figure 1 is a plan view partly broken away showing the lamp positioned on an aircraft, and it is to be understood that the lamp may be positioned above or below the fuselage, and on the nose as well as on the wings. In fact it may be positioned at any suitable point parallel to the longitudinal axis of the aircraft, and Figure 2 is a view in section of my improved lamp.

Referring to Figure 2, the lamp includes a concave generally circular reflector 10, which is preferably spherical. The reflector is provided with a marginal flange 11. The cover glass or light transmitting area 12 is generally circular and bow-shaped and convexly disposed with respect to the reflector surface as shown and of a size substantially completely to cover the area of the reflector. The cover glass 12 is provided with a marginal flange 13, and the flanges 11 and 13 are secured together at 14 so as to form a sealed chamber 15 defined by the cover glass and reflector after the manner of the usual "sealed beam" lamp. Thus, the lamp consists of a sealed chamber or body, the wall of which has a concave light reflecting surface and a light transmitting area convexly disposed with respect thereto.

A filament of suitable candlepower, e. g. 50, 32 or 16 is indicated at 16, and positioned within the chamber 15, on the axis of the lamp being energized by connections 17 with the current supply of the aircraft.

The cover glass 12 gives a clear i. e. white light, or may be suitably colored to give a colored light, such as a yellow which only eliminates the blue and violet rays.

When the lamp is installed on aircraft it is preferably associated with a continuous flashing mechanism not shown.

Referring again to Figure 2, for purposes of illustration, I have shown the reflector 10 of a dimension such that a chordal line extending across the center or axis from the flange 11 is about 4 inches. The reflector is a segment of a circle having a wide radius, namely a length equal to the line C—R, the letter C being the optical center or center of curvature of the reflector. The length of the arc of the segment is about 25 degrees. The term "arc" as mentioned herein means the arc of the segment as described by a circle of which the point C is the center and coinciding with the section through the reflector shown in Figure 2. The filament 16 as shown is located closer to the reflector than to the focal point F, the latter being well outside of the cover glass.

The location of the filament in respect to the reflector, having the characteristics described, is also critical in that (1) an upright enlarged virtual image is produced on the reflector but of smaller area than the total area of the reflector, (2) non-parallel beams are desired, (3) beams having a wide angle spread are desired, (4) it is important that light be reflected from every point of the reflecting surface so that an arrestive illumination will be given regardless of the position at which the lamp is presented, and (5) referring further to Figure 2, beams from the filament 16 are directly visible throughout the area of the cover glass and this is particularly desirable to provide a signal to aircraft approaching directly from the side, at which time the direct beams D will give an adequate indication. In other words, the beams are reflected from the entire area of the reflector and are projected uniformly throughout every point of the cover glass. For example, the light spread shown in Figure 2 encompasses at least 110 degrees as defined by the beams W and W′, and within this area, beams U are uniformly projected throughout the area of the cover glass. It will be noted that the light source or filament produces a spherical angle of illumination substantially of the order of a hemisphere.

While I have only illustrated a single central beam U and other beams U between the same and the extreme beam spread W, it is to be understood that the number of such beams is multitudinous about the central beam U between the extreme wide angle beams W, W′. Hence the entire reflecting surface of the reflector is utilized and a beam pattern on a screen from the lamp shown in Figure 2 will be devoid of any dark spots.

While I have described a 4-inch lamp it is to be understood that the same critical conditions prevail in the case of a smaller lamp as well as a larger one.

I claim:

1. A "sealed beam" running lamp for aircraft having a generally circular concave reflector, the reflector surface being substantially free from dead spots throughout its area, a generally circular concave cover glass convexly disposed with respect to the reflector, said reflector and cover glass being united at their circular edges and forming a sealed chamber in which the cover glass covers substantially the entire area of the reflector, and a light source positioned in the sealed chamber, the light source being located out of the focal point of the reflector and between the reflector and the focal point thereof to produce an upright enlarged virtual image on the reflector of smaller area than the total area of the reflector when the light source is energized, the position of the light source with respect to the reflector and the curvature of the reflector being such that nonparallel beams are reflected from substantially the entire area of the reflector including the central portion thereof, some of said reflected beams having a wide angle spread with respect to the lamp axis, whereby said reflected beams are projected and are visible forwardly, to the sides and above and below the lamp and the illumination is devoid of a central dark area.

2. A "sealed beam" running lamp for aircraft according to claim 1 in which the light source is directly visible throughout substantially the entire area of the cover glass.

3. A lamp consisting of a sealed chamber, said lamp having a generally circular concave reflector, the reflector surface being substantially free from dead spots throughout its area, a generally circular area of light transmitting material, the adjacent marginal portions of the light transmitting area and the reflector being in substantially adjoining relation, the light transmitting area covering substantially the entire area of the reflector, and an electrically energizable light source positioned in the chamber, the light source being located out of the focal point of the reflector and between the reflector and the focal point thereof to produce an upright enlarged virtual image on the reflector of smaller area than the total area of the reflector when the light source is energized, the position of the light source with respect to the reflector and the curvature of the reflector being such that non-parallel beams are reflected from substantially the entire area of the reflector including the central portion thereof, some of said reflected beams having a wide angle spread, said electrically energizable light source producing a spherical angle of illumination substantially of the order of a hemisphere.

4. A lamp consisting of a sealed chamber, the chamber wall having a generally circular concave reflector surface substantially free from dead spots and a generally circular area of light transmitting material convexly disposed with respect to the reflector surface, the light transmitting area covering substantially the entire area of the reflector, and an electrically energizable light source positioned in the chamber, said light source being located out of the focal point of the reflector and between the reflector and the focal point thereof and producing an upright enlarged virtual image on the reflector of smaller area than the total area of the reflector when the light source is electrically energized, the position of the light source with respect to the reflector and the curvature of the reflector being such that non-parallel beams are reflected from substantially the entire area of the reflector including the central portion thereof, some of said reflected beams having a wide angle spread, said light source producing a spherical angle of illumination substantially of the order of a hemisphere.

CHARLES ADLER, JR.